United States Patent
Huang et al.

(10) Patent No.: US 7,898,992 B2
(45) Date of Patent: Mar. 1, 2011

(54) NETWORK APPARATUS WITH SHARED COEFFICIENT UPDATE PROCESSOR AND METHOD THEREOF

(75) Inventors: Liang-Wei Huang, Taipei (TW); Chih-Yung Shih, Taipei (TW); Shieh-Hsing Kuo, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 134 days.

(21) Appl. No.: 12/260,101

(22) Filed: Oct. 29, 2008

(65) Prior Publication Data

US 2009/0109834 A1  Apr. 30, 2009

(30) Foreign Application Priority Data

Oct. 29, 2007 (TW) ................ 96140569 A

(51) Int. Cl.
*H04B 3/20* (2006.01)
*H04B 1/38* (2006.01)
*H04L 12/66* (2006.01)

(52) U.S. Cl. .......... 370/286; 370/290; 370/463; 375/219
(58) Field of Classification Search .......... 370/286–292; 375/222, 227, 254, 278, 284–285, 296, 346–350
See application file for complete search history.

(56) References Cited

U.S. PATENT DOCUMENTS

| 6,823,483 | B1* | 11/2004 | Creigh | 714/701 |
| 6,898,185 | B1* | 5/2005 | Agazzi et al. | 370/241 |
| 6,965,657 | B1* | 11/2005 | Rezvani et al. | 375/346 |
| 7,362,791 | B2* | 4/2008 | Tellado et al. | 375/144 |
| 7,672,368 | B2* | 3/2010 | Agazzi | 375/229 |
| 7,738,655 | B2* | 6/2010 | Sharon et al. | 379/406.08 |
| 2002/0174207 | A1* | 11/2002 | Battou | 709/223 |
| 2004/0106419 | A1 | 6/2004 | Kim | |
| 2005/0243903 | A1* | 11/2005 | Agazzi | 375/219 |

FOREIGN PATENT DOCUMENTS

CN   1476256 A   2/2004

* cited by examiner

*Primary Examiner* — Tri H Phan
(74) *Attorney, Agent, or Firm* — Thomas, Kayden, Horstemeyer & Risley, LLP

(57) ABSTRACT

A network apparatus with a plurality of transport ports and a shared coefficient update processor is proposed. Each of the plurality of transport ports includes a PHY module. The coefficient update processor is coupled to each PHY module and is shared by the plurality of transport ports. The coefficient update processor decides coefficients of each PHY module. The coefficient update processor is dedicated to one of the plurality of transport ports for use in a period of time.

20 Claims, 7 Drawing Sheets

NETWORK APPARATUS WITH SHARED COEFFICIENT UPDATE PROCESSOR AND METHOD THEREOF

BACKGROUND OF THE INVENTION

1. Field of the Invention

The present invention relates to a network apparatus, and more particularly, to a network apparatus with a coefficient update processor shared by a plurality of transport ports.

2. Description of the Prior Art

In the 1 Gbase-T/10 Gbase-T Ethernet system, receivers must continuously and dynamically adjust coefficients of circuits, such as equalizers and interference cancellers, due to the fact that channels vary as time passes by. Hence, coefficient update processors are necessarily used for continuously tracking the condition of each channel.

Since it is not difficult to let multiple computers get logged on the network at the same time, various network products having multiple transport ports have been promoted into the market, for example, switches, Hubs, and IP sharing hardware. If independent coefficient update processors to update internal channel coefficients are necessary for each transport port of such network products, it would really cause a burden despite considerations of power consumption or cost.

SUMMARY OF THE INVENTION

It is one of the objectives of the claimed invention to provide a network apparatus with a coefficient update processor shared by a plurality of transport ports and related method to solve the abovementioned problems.

According to an exemplary embodiment of the present invention, a network apparatus with a shared coefficient update processor is provided. The network apparatus includes one or a plurality of transport ports, and a coefficient update processor. Each transport port includes a PHY module. The coefficient update processor is coupled to each PHY module and shared by the plurality of transport ports for deciding coefficients of each PHY module, wherein the coefficient update processor is dedicated to one of the PHY modules for use in a period of time. The coefficient update processor operates in a time domain or a frequency domain.

According to an exemplary embodiment of the present invention, a method applied to a network apparatus for sharing a coefficient update processor is provided. The network apparatus includes one or a plurality of transport ports, wherein each transport port has a PHY module. The method includes providing a coefficient update processor, utilizing the coefficient update processor to converge coefficients of a first PHY module of the PHY modules, and after converging the coefficients of the first PHY module, utilizing the coefficient update processor to converge coefficients of a second PHY module of the PHY modules or to continuously converge the coefficients of the first PHY module. The coefficient update processor is dedicated to one of the PHY modules for use in a period of time.

These and other objectives of the present invention will no doubt become obvious to those of ordinary skill in the art after reading the following detailed description of the preferred embodiment that is illustrated in the various figures and drawings.

DETAILED DESCRIPTION

During the connecting processes of a network, coefficients of each channel need to be converged immediately. At this time, coefficient update processors must make the coefficients converge with all their strength. However, after the network finishes the connecting processes, variations of the channels become quite slow and the update frequency of coefficients will be rather small. Because of such characteristics, the sharing of the coefficient update processor becomes a practicable solution. Therefore, a network apparatus with a shared coefficient update processor is disclosed in the present invention, and its description is detailed herein.

Figure 1:
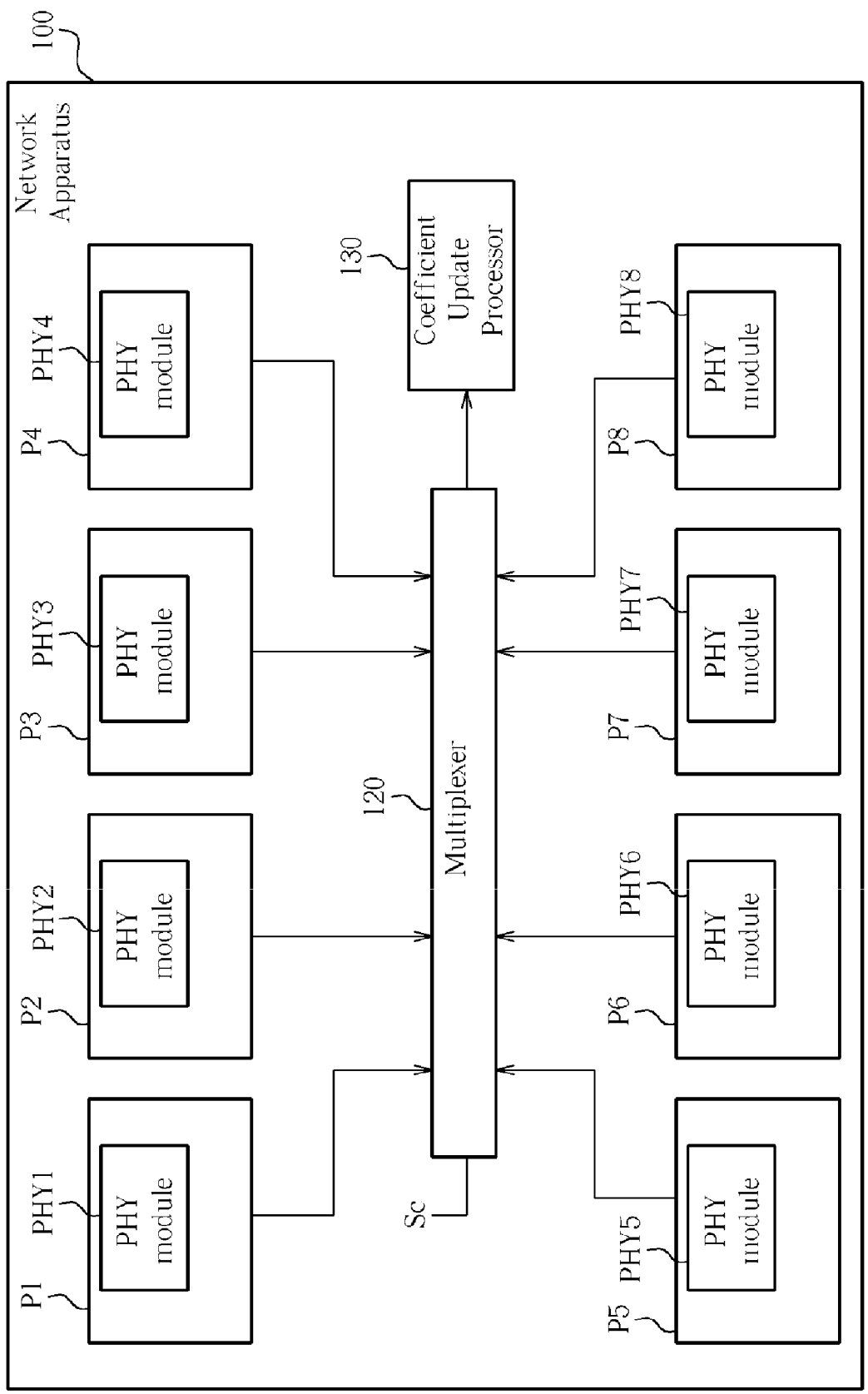
FIG. 1 is a diagram of a network apparatus with a shared coefficient update processor illustrated according to a first embodiment of the present invention.

Please refer to FIG. 1. FIG. 1 is a diagram of a network apparatus 100 with a shared coefficient update processor illustrated according to a first embodiment of the present invention. In this embodiment, the network apparatus 100 uses a switch with eight ports as an example without departing from the technology disclosed in the present invention. The network apparatus 100 includes eight transport ports P1-P8, a multiplexer 120, and a coefficient update processor 130. Each of the transport ports P1-P8 includes a PHY module PHY1-PHY8, namely. The multiplexer 120 is coupled between each PHY module PHY1-PHY8 of each transport port P1-P8 and the coefficient update processor 130 for selecting one of the transport ports P1-P8 to use the coefficient update processor 130 according to a control signal $S_c$. The coefficient update processor 130 is coupled to the multiplexer 120 and is shared by the transport ports P1-P8. The coefficient update processor 130 decides coefficients of the PHY modules PHY1-PHY8 of the transport ports P1-P8. The coefficient update processor 130 is dedicated to one of the PHY modules for use in a period of time to reach a goal of sharing circuit elements. In other words, through the choice of the control signal $S_c$ of the multiplexer 120, the coefficient update processor 130 is provided to one of the PHY modules for converging or updating the coefficients of the PHY module in a period of time. Therefore, a plurality of PHY modules can share the same coefficient update processor 130 to reach a goal of saving area and cost. Moreover, the coefficient update processor 130 can operate in a time domain or in a frequency domain through conversions of equations.

Please note that, the abovementioned network apparatus 100 can be a switch or network apparatus of other types. In addition, the number of the transport ports is merely an example for illustrating the present invention, and should not be a limitation of the present invention. Please note again that the network apparatus 100 can be applied to 10M/100M Base-T system, a 1 G Base-T system, or a 10 G Base-T system, and is not limited to these as mentioned.

The coefficients decided by the coefficient update processor 130 could be echo eliminating coefficients, near end crosstalk (NEXT) eliminating coefficients, and auto gain control (AGC) coefficients, and etc. Those skilled in the art should appreciate that various applications of the coefficient update processor 130 could be applied, and further description is omitted here for brevity. Regarding the implementation of the coefficient update processor 130, the coefficient update processor 130 can be implemented by a correlator, a least mean square (LMS) filter, a least square (LS) filter, or a recursive least square (RLS) filter. The implementation should not be limited to the foregoing embodied objects only and can also be implemented by processors of other types.

Figure 2:
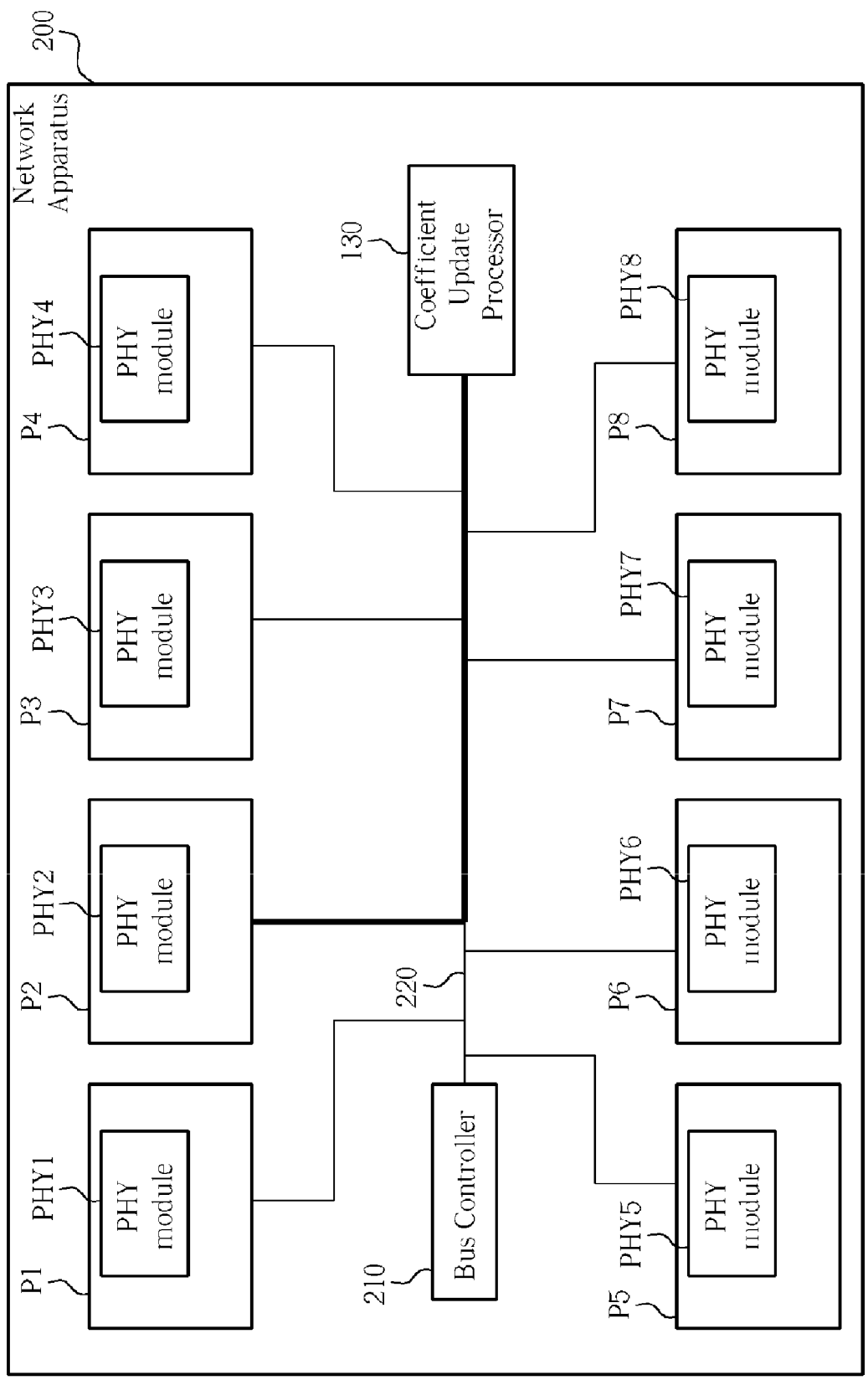
FIG. 2 is a diagram of a network apparatus with a shared coefficient update processor illustrated according to a second embodiment of the present invention.

Of course, the abovementioned sharing architecture by adopting the multiplexer 120 is merely an embodiment, and should not be limited to this only. The sharing architecture can also be implemented by using a bus and a bus controller. Please refer to FIG. 2. FIG. 2 is a diagram of a network apparatus 200 with a shared coefficient update processor illustrated according to a second embodiment of the present invention. The network apparatus 200 in FIG. 2 is similar to the network apparatus 100 in FIG. 1, and the difference between them is that the network apparatus 200 replaces the multiplexer 120 of the network apparatus 100 in FIG. 1 by using a bus 220 and a bus controller 210. As shown in FIG. 2, the bus 220 is used for connecting the transport ports P1-P8 to the coefficient update processor 130. The bus controller 210 is coupled to the bus 220 for controlling the transport ports P1-P8 and for allowing one of the transport ports P1-P8 to use the coefficient update processor 130. For example, through the connection of the bus 220 and the control of the bus controller 210, the coefficient update processor 130 is dedicated to one of the PHY modules, such as the PHY module PHY2, for use in a period of time, which is highlighted with a thick line in FIG. 2.

The embodiments above are presented merely for describing applications of the present invention, and in no way should be considered to be limitations of the scope of the present invention. It will be obvious to those skilled in the art that various modifications of the coefficient update processor 130 may be made without departing from the spirit of the present invention.

Through descriptions of the embodiments above, those skilled in the art may expand the concept of a shared coefficient update processor in other applications without departing from the spirit of the present invention. For example, the concept of shared coefficient update processor can be expanded to apply to updating coefficients of different elements within the same transport port. Therefore, the usage efficiency of the coefficient update processor can be improved to reach a goal of saving area and cost.

Figure 3:
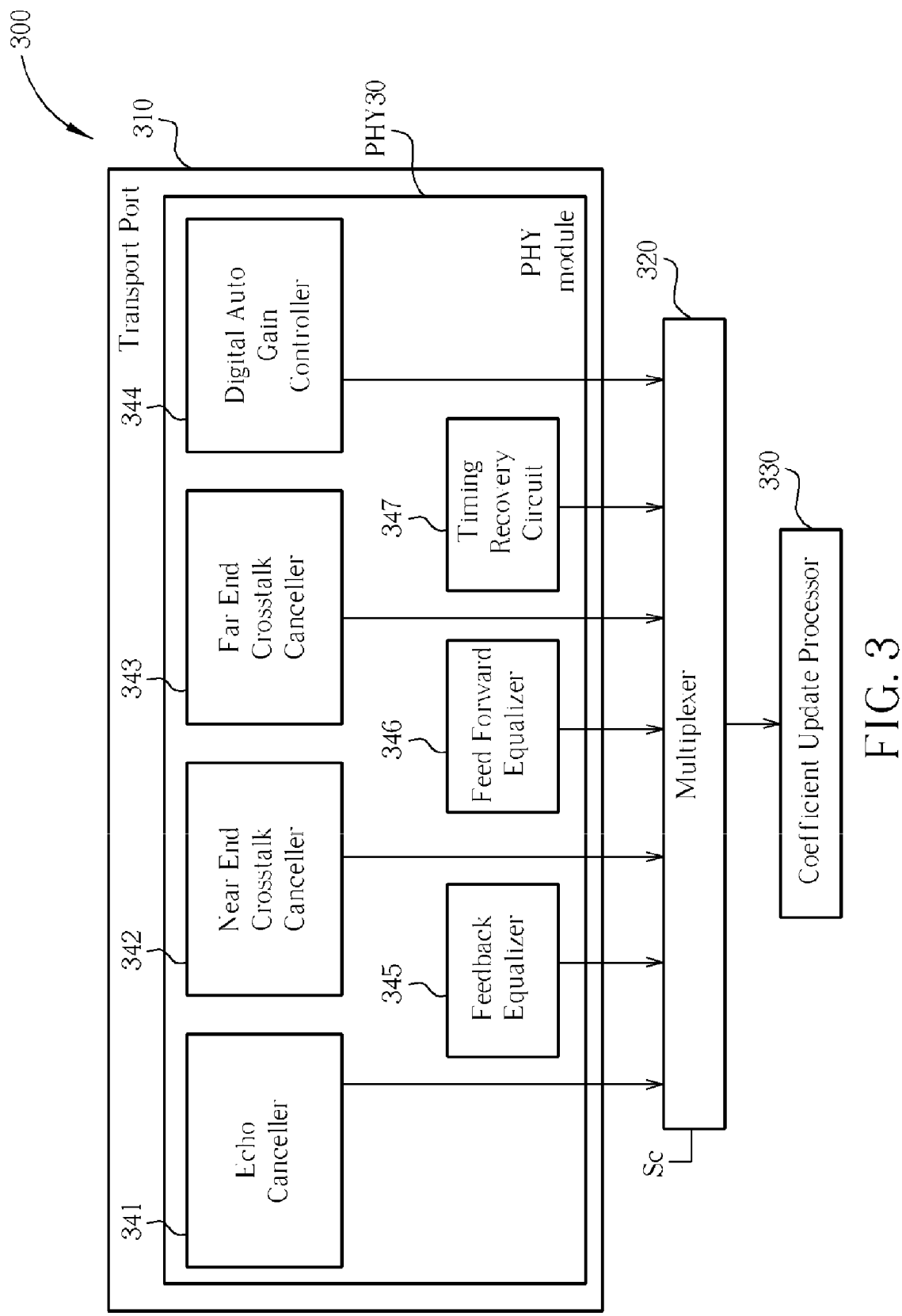
FIG. 3 is a diagram of a network apparatus with a shared coefficient update processor illustrated according to a third embodiment of the present invention.

Please refer to FIG. 3. FIG. 3 is a diagram of a network apparatus 300 with shared coefficient update processor illustrated according to a third embodiment of the present invention. In this embodiment, only the elements inside a single transport port are focused. The network apparatus 300 includes at least one transport port 310, a multiplexer 320, and a coefficient update processor 330. The transport port 310 includes a PHY module PHY30. The PHY module PHY30 includes an echo canceller 341, a near end crosstalk (NEXT) canceller 342, a far end crosstalk (FEXT) canceller 343, a digital auto gain controller 344, a feedback equalizer 345, a feed forward equalizer 346, and a timing recovery circuit 347, wherein operations of each element are different. The multiplexer 320 is coupled between the elements 341-347 and the coefficient update processor 330 for selecting one of the elements 341-347 to use the coefficient update processor 330 according to a control signal $S_c$. The coefficient update processor 330 is coupled to the multiplexer 320 and is shared by the elements 341-347. The coefficient update processor 330 decides coefficients of the elements 341-347 of the PHY module PHY30. The coefficient update processor 330 is dedicated to one of the elements for use in a period of time. In other words, through the choice of the control signal $S_c$ of the multiplexer 320, the coefficient update processor 330 is provided to one of the elements 341-347 for converging or updating the coefficients of the element in a period of time. Therefore, a plurality of elements inside the same PHY module can share the same coefficient update processor 330 to reach a goal of saving area and cost.

Please note that, in the abovementioned embodiment, the concept of a shared coefficient update processor is suitable for applications of a PHY module of a single transport port with multiple elements, but this is not meant to be a limitation of the present invention. The concept of a shared coefficient update processor can also be suitable for applications of the PHY modules of a plurality of transport port with multiple elements, i.e., the combination of the embodiments in FIG. 1 and FIG. 3.

Please note that, the abovementioned echo canceller 341, near end crosstalk (NEXT) canceller 342, far end crosstalk (FEXT) canceller 343, digital auto gain controller 344, feedback equalizer 345, feed forward equalizer 346, and timing recovery circuit 347 are presented herein merely for describing applications of the present invention, and in no way should be considered to be limitations of the scope of the present invention. The number of the elements inside the PHY module PHY30 can also be increased or decreased as desired.

Of course, the abovementioned sharing architecture by adopting the multiplexer 320 is merely an implementation with the shared coefficient update processor 330, and is not meant to be limited to this only. For example, the sharing architecture can be implemented by using a bus and a bus controller. Operations of the bus and the bus controller are already detailed above (referring to FIG. 2), further description is thereby omitted herein for brevity.

Through descriptions of the embodiment mentioned above, those skilled in the art should appreciate the concept of sharing a coefficient update processor and should expand the concept of a shared coefficient update processor in other applications while without departing from the spirit provided by the present invention. For example, the concept of a shared coefficient update processor can be expanded to apply to update coefficients of different segments of an identical element within the same transport port. Therefore, the usage efficiency of the coefficient update processor can be further improved to reach a goal of saving area and cost.

Figure 4:
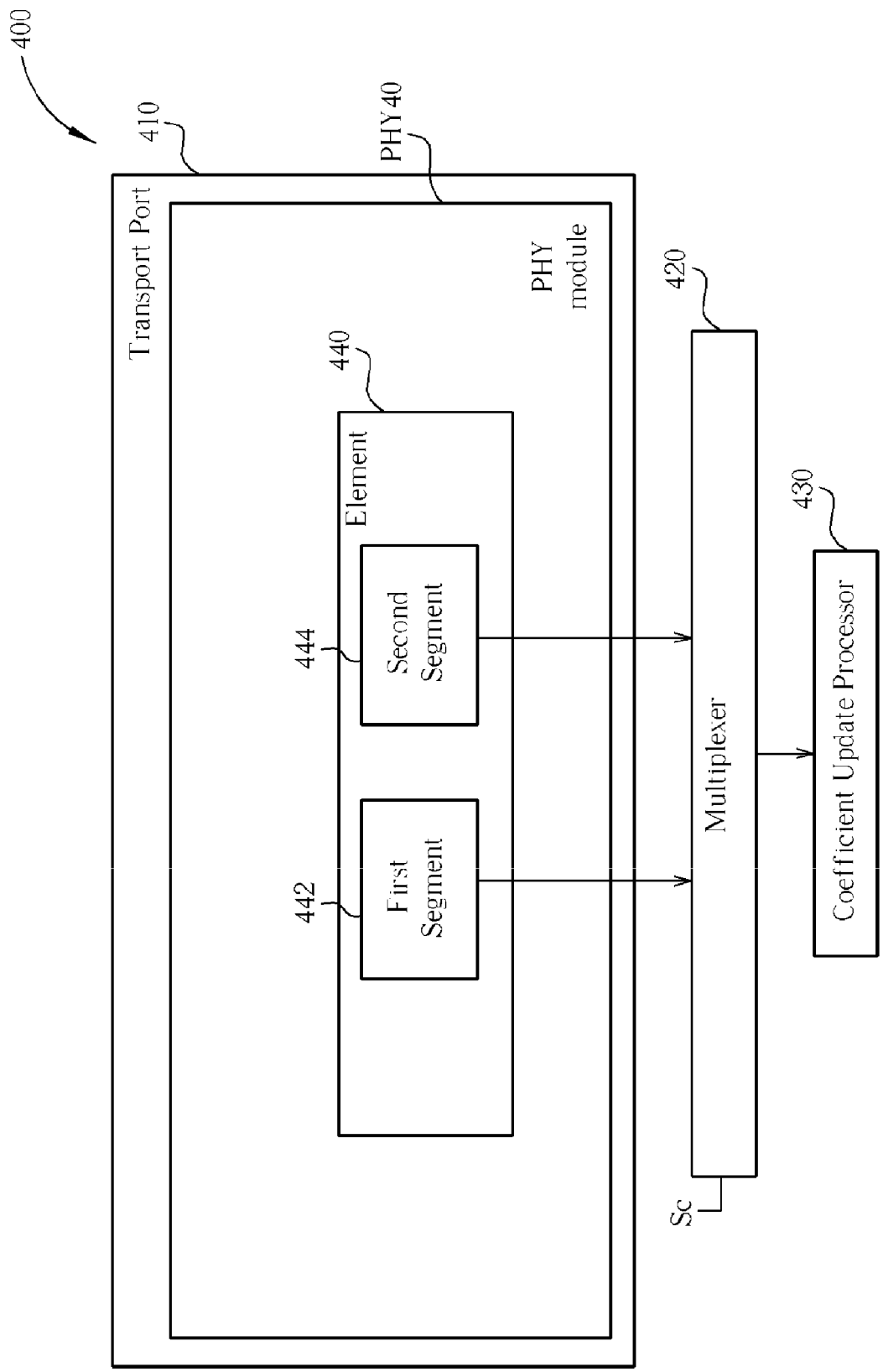
FIG. 4 is a diagram of a network apparatus with a shared coefficient update processor illustrated according to a fourth embodiment of the present invention.

Please refer to FIG. 4. FIG. 4 is a diagram of a network apparatus 400 with a shared coefficient update processor illustrated according to a fourth embodiment of the present invention. In this embodiment, the coefficient update processor is shared between different segments of a single element inside a single transport port. The network apparatus 400 includes at least one transport port 410, a multiplexer 420, and a coefficient update processor 430. The transport port 410 includes a PHY module PHY40, which includes an element 440. The element 440 includes a first segment 442 and a second segment 444. For example, the element 440 can be one of the abovementioned echo canceller 341, a near end crosstalk (NEXT) canceller 342, a far end crosstalk (FEXT) canceller 343, a digital auto gain controller 344, a feedback equalizer 345, a feed forward equalizer 346, and a timing recovery circuit 347, but is not limited to this only and can be elements of other types. By assuming that the element 440 is an echo canceller, the first segment 442 and the second segment 444 can be respectively viewed as an odd coefficient echo canceller and an even coefficient echo canceller. The multiplexer 420 is coupled between the first segment 442 and the second segment 444, and the coefficient update processor 430 for selecting one of the segments 442 and 444 to use the coefficient update processor 430 according to a control signal $S_c$. The coefficient update processor 430 is coupled to the multiplexer 420 and is shared by the segments 442 and 444. The coefficient update processor 430 decides the coefficients of the segments 442 and 444 of the element 440 inside the PHY module PHY40. The coefficient update processor 430 is dedicated to one of the segments for use in a period of time. In other words, through the choice of the control signal $S_c$ of the multiplexer 420, the coefficient update processor 430 is provided to one of the segments 442 and 444 for converging or updating the coefficients of the element in a period of time. Therefore, a plurality of segments of a single element inside the same PHY module can share the same coefficient update processor 430 to reach a goal of saving area and cost. Furthermore, the coefficient update processor is provided to different segments of different elements for use in a certain order, so that the time for each element to wait for using the coefficient update processor can be reduced.

Please note that, in the abovementioned embodiment, the concept of a shared coefficient update processor is also suitable for applications of a single element of a single transport port with different segments, but this is not a limitation of the present invention. The concept of a shared coefficient update processor can also be suitable for applications of different elements of a single transport port with multiple segments or different elements of a plurality of transport port with multiple segments, i.e., any combination of the embodiments in FIG. 1, FIG. 3, and FIG. 4. In other words, these embodiments in FIG. 1-FIG. 4 are presented merely for describing the concept of the present invention, and in no way should be considered to be limitations of the scope of the present invention. It will be obvious to those skilled in the art that various modifications of the shared coefficient update processor may be made without departing from the spirit of the present invention.

Please note again that, the first segment 442 and the second segment 444 mentioned above are presented merely for describing applications of the present invention, and in no way should be considered to be limitations of the scope of the present invention. The element 440 can be divided into a plurality of segments, and the number of the segments of the element 440 can be adjusted depending on certain demands.

Obviously, the abovementioned sharing architecture by adopting the multiplexer 420 is merely an implementation with the shared coefficient update processor 430, and is not limited to those as mentioned.

Figure 5:
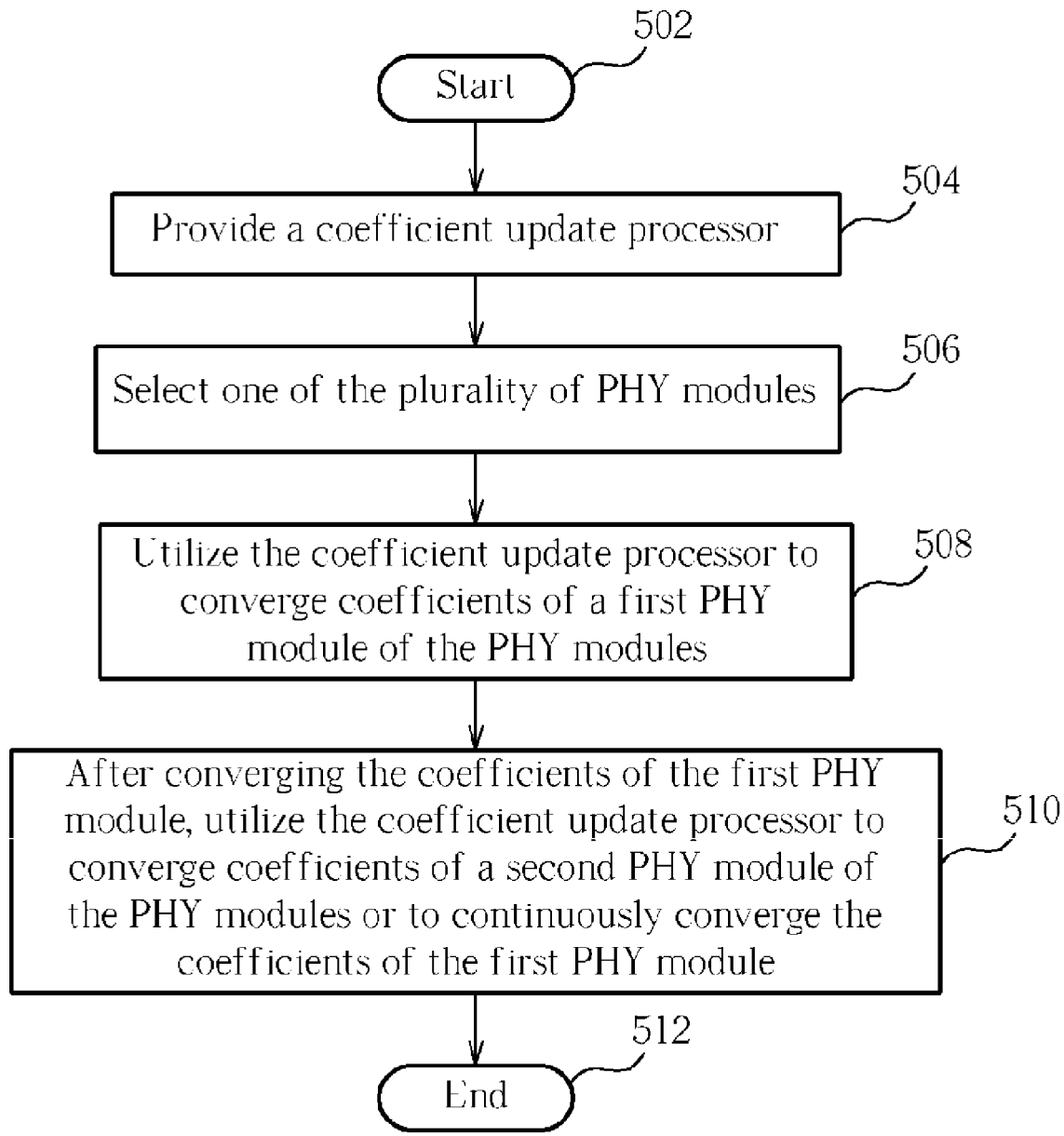
FIG. 5 is a flowchart illustrating a method for sharing a coefficient update processor according to an exemplary embodiment of the present invention.

Please refer to FIG. 5. FIG. 5 is a flowchart illustrating a method for sharing a coefficient update processor according to an exemplary embodiment of the present invention. Please note that the following steps are not limited to be performed according to the exact sequence shown in FIG. 5 if a roughly identical result can be obtained. The method includes the following steps:

Step 502: Start.
Step 504: Provide a coefficient update processor.
Step 506: Select one of the plurality of PHY modules.
Step 508: Utilize the coefficient update processor to converge coefficients of a first PHY module of the PHY modules.

Step 510: After converging the coefficients of the first PHY module, utilize the coefficient update processor to converge coefficients of a second PHY module of the PHY modules or to continuously converge the coefficients of the first PHY module.
Step 512: End.

The following description details how each element operates by collocating the steps shown in FIG. 5 and the elements shown in FIG. 1. In this embodiment, the network apparatus 100 includes eight transport ports P1-P8, and each of the transport ports P1-P8 respectively includes a PHY module PHY1-PHY8. In Step 504, the coefficient update processor 130 is provided. The multiplexer 120 selects one of the PHY modules PHY1-PHY8 according to the control signal $S_C$ (Step 506), and the coefficient update processor 130 is then utilized for converging coefficients of a first PHY module, such as the PHY module PHY1 of the transport port P1 (Step 508). After converging the coefficients of the first PHY module PHY1, the coefficient update processor 130 is then utilized for converging coefficients of a second PHY module, such as the PHY module PHY2 of the transport port P2, or for continuously converging the coefficients of the first PHY module PHY1 (Step 510). The coefficient update processor 130 is dedicated to one of the PHY modules for use in a period of time.

Figure 6:
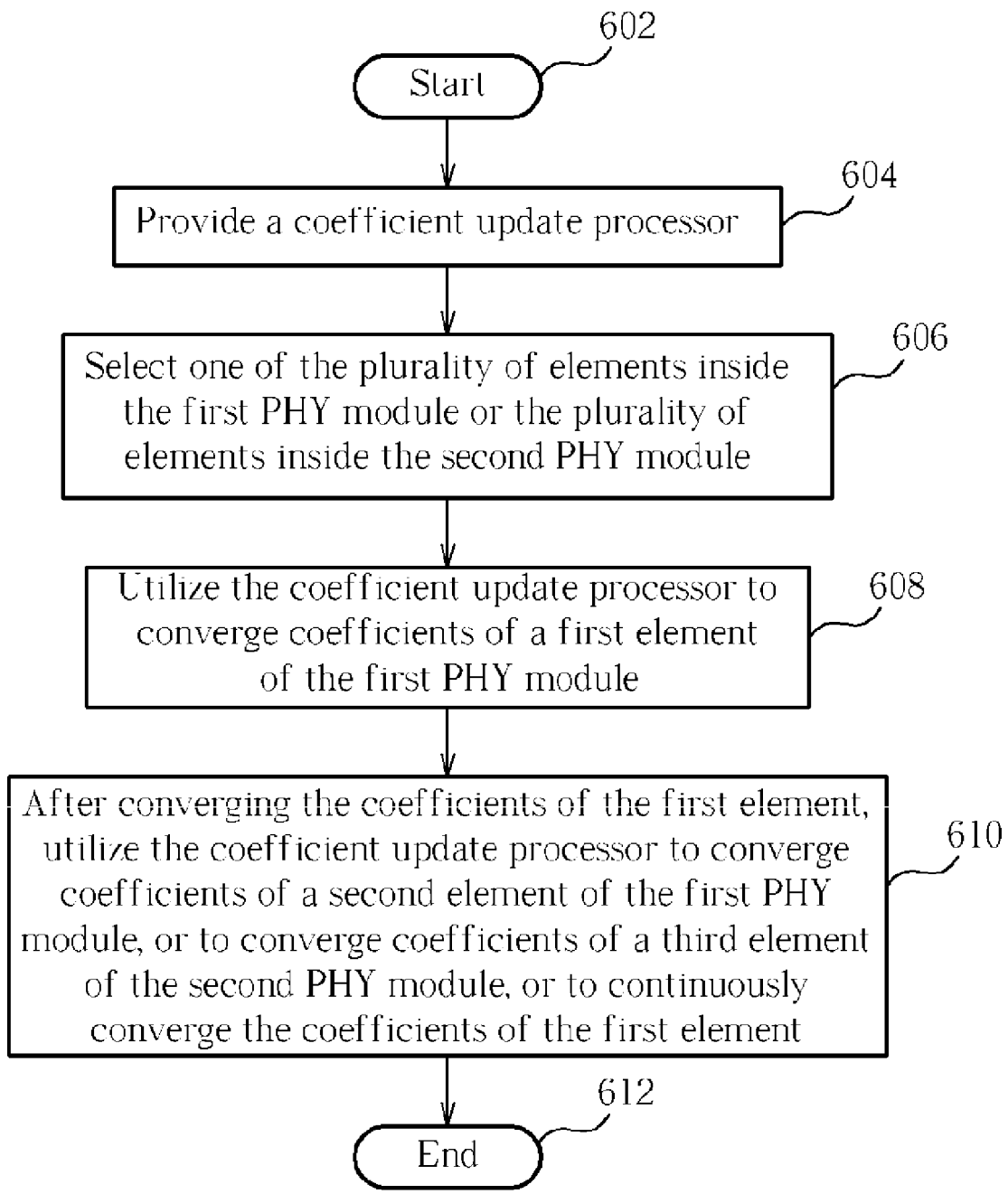
FIG. 6 is a flowchart illustrating a method for sharing a coefficient update processor according to another exemplary embodiment of the present invention.

Please refer to FIG. 6. FIG. 6 is a flowchart illustrating a method for sharing a coefficient update processor according to another exemplary embodiment of the present invention. The method includes the following steps:

Step 602: Start.
Step 604: Provide a coefficient update processor.
Step 606: Select one of the plurality of elements inside the first PHY module or the plurality of elements inside the second PHY module.
Step 608: Utilize the coefficient update processor to converge coefficients of a first element of the first PHY module.
Step 610: After converging the coefficients of the first element, utilize the coefficient update processor to converge coefficients of a second element of the first PHY module, or to converge coefficients of a third element of the second PHY module, or to continuously converge the coefficients of the first element.
Step 612: End.

The following description details how each element operates by collocating the steps shown in FIG. 6 and the elements shown in FIG. 3. In this embodiment, the network apparatus 300 includes at least one transport port 310, and the transport port 310 includes a PHY module PHY30. The PHY module PHY30 includes a plurality of elements 341-347. In Step 604, the coefficient update processor 330 is provided. The multiplexer 320 selects one of the elements 341-347 of the PHY module PHY30 according to the control signal $S_C$ (Step 606), and the coefficient update processor 330 is then utilized for converging coefficients of a first element of the selected first PHY module, such as the echo canceller 341 of the PHY module PHY30 (Step 608). After converging the coefficients of the echo canceller 341, the coefficient update processor 330 is then utilized for converging coefficients of the NEXT canceller 342, for converging the coefficients of a third element of the second PHY module, or for continuously converging the coefficients of the echo canceller 341 (Step 610). The coefficient update processor 330 is dedicated to one of the elements for use in a period of time.

Figure 7:
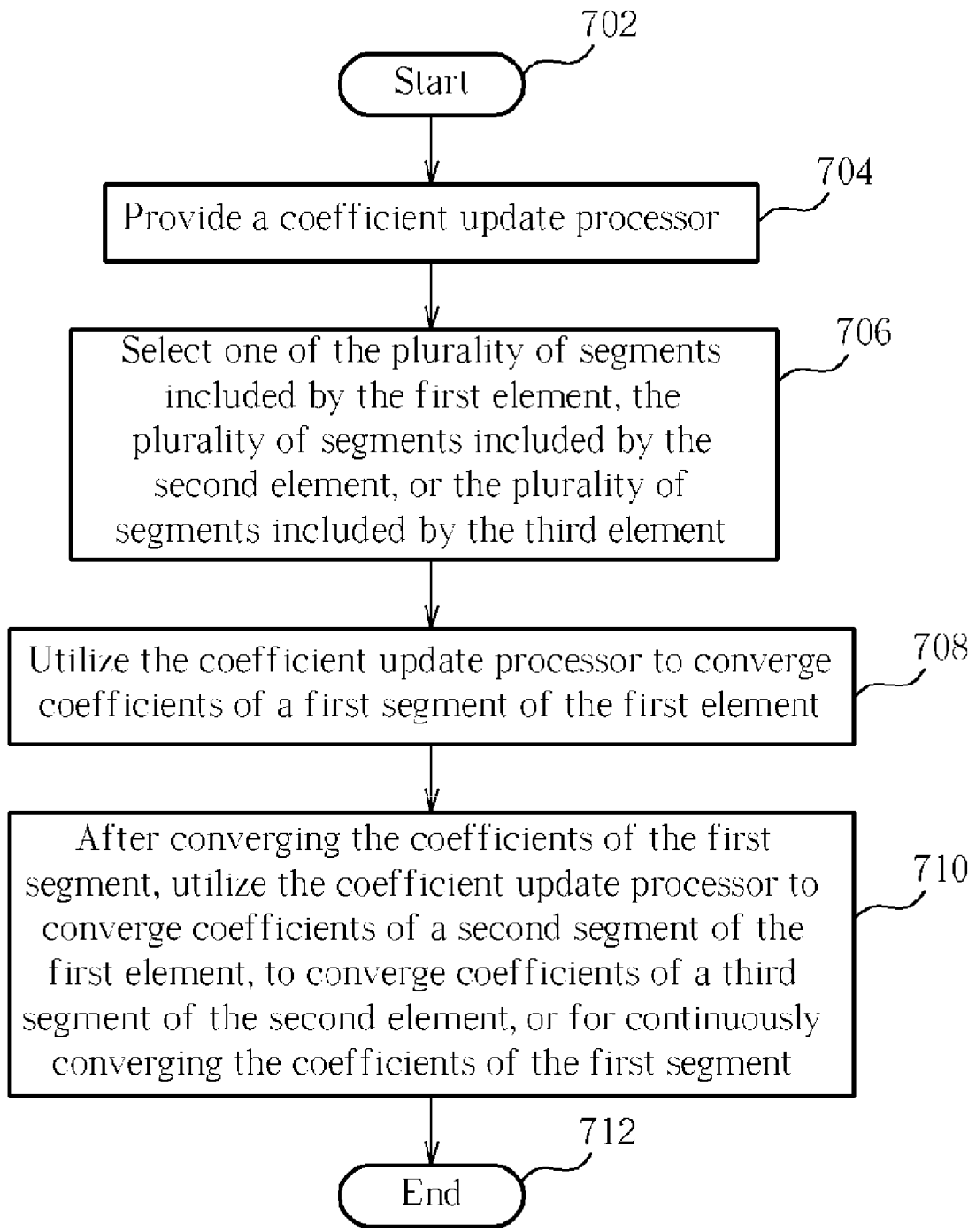
FIG. 7 is a flowchart illustrating a method for sharing a coefficient update processor according to another exemplary embodiment of the present invention.

Please refer to FIG. 7. FIG. 7 is a flowchart illustrating a method for sharing a coefficient update processor according to another exemplary embodiment of the present invention. The method includes the following steps:

Step 702: Start.
Step 704: Provide a coefficient update processor.
Step 706: Select one of the plurality of segments included by the first element, the plurality of segments included by the second element, or the plurality of segments included by the third element.
Step 708: Utilize the coefficient update processor to converge coefficients of a first segment of the first element.
Step 710: After converging the coefficients of the first segment, utilize the coefficient update processor to converge coefficients of a second segment of the first element, to converge coefficients of a third segment of the second element, or for continuously converging the coefficients of the first segment.
Step 712: End.

The following description details how each element operates by collocating the steps shown in FIG. 7 and the elements shown in FIG. 4. In this embodiment, the network apparatus 400 includes at least one transport port 410, and the transport port 410 includes a PHY module PHY40. The PHY module PHY40 includes the element 440, which includes the first segment 442 and the second segment 444. In Step 704, the coefficient update processor 430 is provided. The multiplexer 420 selects one of the segments 442 and 444 of the element 440 according to the control signal $S_C$ (Step 706), and the coefficient update processor 430 is then utilized for converging coefficients of the first segment 442 of the element 440 (Step 708). After converging the coefficients of the first segment 442, the coefficient update processor 430 is then utilized for converging coefficients of the second segment 444 of the element 440, or for converging the coefficients of a third segment of the second element, or for continuously converging the coefficients of the first segment 442 (Step 710). The coefficient update processor 430 is dedicated to one of the segments for use in a period of time.

Please note that, the steps of the abovementioned flowcharts are merely exemplary embodiments of the present invention, and in no way should be considered to be limitations of the scope of the present invention. These methods can include other intermediate steps without departing from the spirit of the present invention. Those skilled in the art should observe that various modifications of these methods may be made.

The abovementioned embodiments are presented merely for describing the present invention, and in no way should be considered to be limitations of the scope of the present invention. The abovementioned network apparatuses 100-400 can be a switch, but is not limited to this only and can be network apparatuses of other types. In addition, the number of the transport ports is represented merely for describing applications of the present invention, and in no way should be considered to be limitations of the scope of the present invention. Please note that, the network apparatuses 100-400 can be applied to a 10M/100M Base-T system, a 1 G Base-T system, or a 10 G Base-T system, but is not limited to this only and can be applied to network systems of other types. Moreover, the coefficient update processors 130-430 can operate in a time domain, or can operate in a frequency domain through conversions of mathematic equations. Those skilled in the art should readily know that this is not a limitation of the present invention. The abovementioned coefficient update processor can be implemented by a correlator, a least mean square (LMS) filter, a least square (LS) filter, or a recursive least square (RLS) filter, but is not limited to this only and can be implemented by coefficient update processors of other types. Of course, the abovementioned sharing architecture by adopting the multiplexer is merely an implementation with the shared coefficient update processor, but is not limited to this only and can be implemented by other ways. For example, the sharing architecture can be implemented by using a bus and a bus controller. Please also note that, the abovementioned echo canceller 341, the near end crosstalk (NEXT) canceller 342, the far end crosstalk (FEXT) canceller 343, the digital auto gain controller 344, the feedback equalizer 345, the feed forward equalizer 346, and the timing recovery circuit 347 are presented merely for describing applications of the present invention, and in no way should be considered to be limitations of the scope of the present invention. A number of the elements inside the PHY module can be increased or decreased depending on demands. Furthermore, the steps of the method shown in FIG. 5-FIG. 7 need not be in the exact order shown and need not be contiguous, and those skilled in the art should observe that various modifications of these methods may be made without departing from the spirit of the present invention.

As can be seen, the concept of a shared coefficient update processor can be suitable for applications of multiple PHY modules of a plurality of transport ports, such as the embodiments in FIG. 1 and FIG. 2, applications of a PHY module of a single transport port with multiple elements, such as the embodiment in FIG. 3, applications of a single element of a single transport port with different segments, such as the embodiment in FIG. 4, or any combination of the embodiments in FIG. 1, FIG. 3, and FIG. 4. It will be obvious to those skilled in the art that various modifications of the shared coefficient update processor may be made without departing from the spirit of the present invention.

In summary, the present invention provides a network apparatus with shared coefficient update processor and related method. The sharing architecture can be implemented by using a multiplexer or a bus together with a bus controller. Therefore, one coefficient update processor can be provided for the PHY modules of a plurality of transport ports. Even more, the concept of a shared coefficient update processor can be expanded to other applications. For example, the concept of a shared coefficient update processor can be expanded to apply to updating coefficients of different elements of an identical transport port, or different segments of an identical element within the same transport port, or any combination of them. Therefore, not only the usage efficiency of the coefficient update processor can be further improved, but also the goal of saving area and cost can be achieved.

Those skilled in the art will readily observe that numerous modifications and alterations of the device and method may be made while retaining the teachings of the invention.

What is claimed is:

1. A network apparatus with a shared coefficient update processor, comprising:
   one or a plurality of transport ports, each transport port comprising a PHY module; and
   a coefficient update processor, coupled to each PHY module and shared by the plurality of transport ports, for deciding coefficients of each PHY module, wherein the coefficient update processor is dedicated to one of the PHY modules for use in a period of time.

2. The network apparatus of claim 1, wherein each PHY module comprises:
   a first element; and
   a second element, wherein the first element and the second element share the coefficient update processor, and the coefficient update processor is dedicated to one of the elements for use in a period of time.

3. The network apparatus of claim 2, wherein the first element is an echo canceller, a near end crosstalk (NEXT)

canceller, a far end crosstalk (FEXT) canceller, a digital auto gain controller, a feedback equalizer, a feed forward equalizer, or a timing recovery circuit.

4. The network apparatus of claim 3, wherein the second element is an echo canceller, a near end crosstalk (NEXT) canceller, a far end crosstalk (FEXT) canceller, a digital auto gain controller, a feedback equalizer, a feed forward equalizer, or a timing recovery circuit, and the second element is different from the first element.

5. The network apparatus of claim 2, wherein the first element comprises:
   a first segment; and
   a second segment, wherein the first segment and the second segment share the coefficient update processor, and the coefficient update processor is dedicated to one of the segments for use in a period of time.

6. The network apparatus of claim 1, wherein each PHY module comprises:
   a first segment, a second segment, and an Nth segment, for collectively accomplishing operations of an element of the PHY module, wherein the first segment, the second segment, and the Nth segment share the coefficient update processor, but the coefficient update processor is dedicated to one of the segments for use in a period of time.

7. The network apparatus of claim 6, wherein the element is an echo canceller, a near end crosstalk (NEXT) canceller, a far end crosstalk (FEXT) canceller, a digital auto gain controller, a feedback equalizer, a feed forward equalizer, or a timing recovery circuit.

8. The network apparatus of claim 1, further comprising a multiplexer for deciding a usage authority of the coefficient update processor according to a control signal.

9. The network apparatus of claim 1, further comprising:
   a bus, coupled to the plurality of transport ports and the coefficient update processor; and
   a bus controller, coupled to the bus, for controlling the plurality of transport ports and for allowing one of the transport ports to use the coefficient update processor.

10. The network apparatus of claim 1, wherein the coefficient update processor operates in a time domain.

11. The network apparatus of claim 1, wherein the coefficient update processor operates in a frequency domain.

12. The network apparatus of claim 1, wherein the network apparatus is applied to at least one of a 10M/100M Base-T system, a 1 G Base-T system, and a 10 G Base-T system.

13. The network apparatus of claim 1, wherein the network apparatus is a switch.

14. A method for sharing a coefficient update processor applied to a network apparatus having one or a plurality of transport ports, each transport port having a PHY module, the method comprising the following steps:
   providing a coefficient update processor;
   utilizing the coefficient update processor to converge coefficients of a first PHY module of the PHY modules; and
   after converging the coefficients of the first PHY module, utilizing the coefficient update processor to converge coefficients of a second PHY module of the PHY modules or to continuously converge the coefficients of the first PHY module;
   wherein the coefficient update processor is dedicated to one of the PHY modules for use in a period of time.

15. The method of claim 14, wherein the first PHY module and the second PHY module respectively comprise one or a plurality of elements, and the step of converging the coefficients of the second PHY module or continuously converging the coefficients of the first PHY module comprises:
   utilizing the coefficient update processor to converge coefficients of a first element of the first PHY module; and
   after converging the coefficients of the first element, utilizing the coefficient update processor to converge coefficients of a second element of the first PHY module, or to converge coefficients of a third element of the second PHY module, or to continuously converge the coefficients of the first element;
   wherein the coefficient update processor is dedicated to one of the elements for use in a period of time.

16. The method of claim 15, wherein the first element, the second element, and the third element are respectively selected from a group comprising an echo canceller, a near end crosstalk (NEXT) canceller, a far end crosstalk (FEXT) canceller, a digital auto gain controller, a feedback equalizer, a feed forward equalizer, and a timing recovery circuit, and the second element is selected to be different from the first element.

17. The method of claim 15, wherein the first element, the second element, and the third element respectively comprises one or a plurality of segments, and the step of converging the coefficients of the second element, or converging the coefficients of the third element, or continuously converging the coefficients of the first element comprises:
   utilizing the coefficient update processor to converge coefficients of a first segment of the first element; and
   after converging the coefficients of the first segment, utilizing the coefficient update processor to converge coefficients of a second segment of the first element, or to converge coefficients of a third segment of the second element, or to continuously converge the coefficients of the first segment;
   wherein the coefficient update processor is dedicated to one of the segments for use in a period of time.

18. The method of claim 14, wherein the coefficient update processor operates in a time domain.

19. The method of claim 14, wherein the coefficient update processor operates in a frequency domain.

20. The method of claim 14, wherein the method is applied to at least one of a 10M/100M Base-T system, a 1 G Base-T system, and a 10 G Base-T system.

* * * * *